Patented Jan. 12, 1954

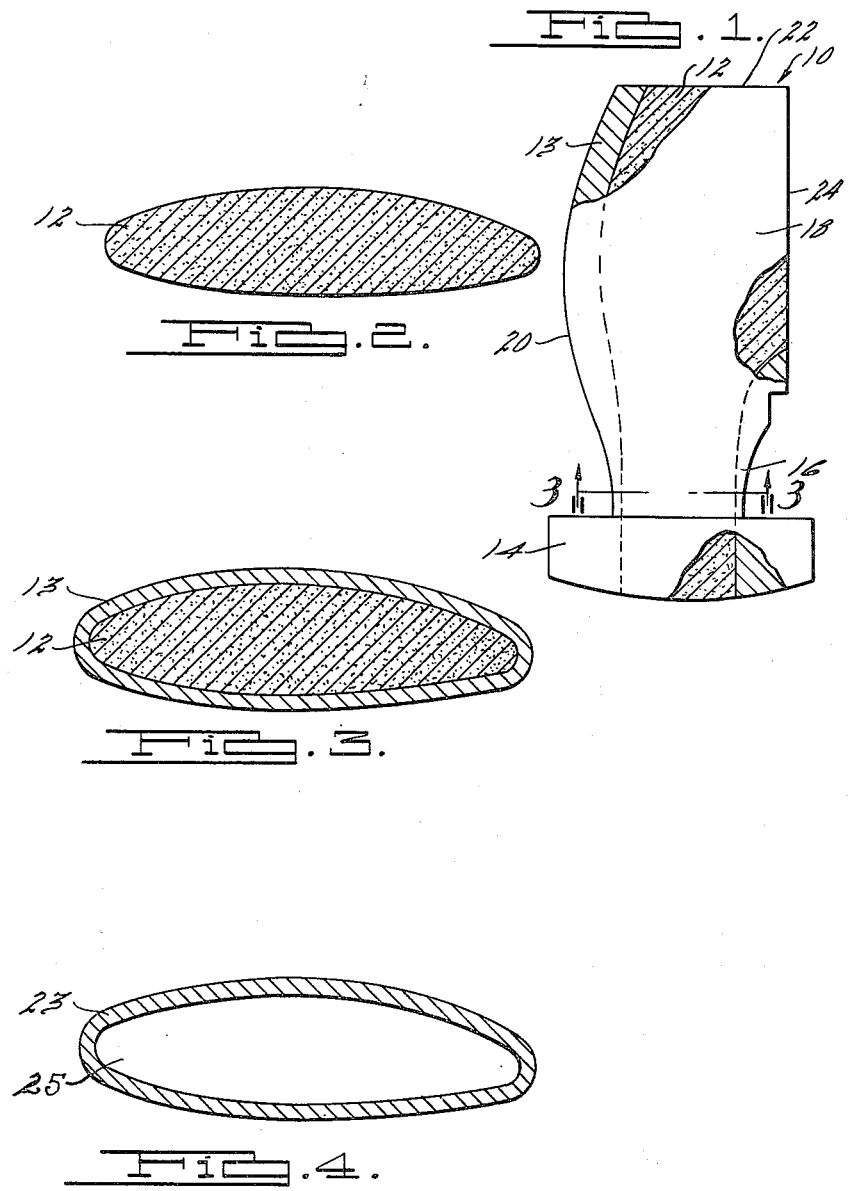

2,665,881

UNITED STATES PATENT OFFICE 2,665,881

COOLED TURBINE BLADE

Robert H. Smith and Cornelius J. Van Haltern, Detroit, Mich., assignors to Chrysler Corporation, Highland Park, Mich., a corporation of Delaware Application June 15, 1948, Serial No. 33,108

1 Claim. (Cl. 253—39.15)

This invention relates to a structure having internal passages and to a method for producing such structure. More specifically, it relates to the production of an object such as a turbine blade or the like having cooling passages formed therein.

In cooling the blades of a gas turbine unit, for example, the coolant is passed through the interior of the blades and is given its fullest effect by providing the interior of the blade with circuitous passageways through which the coolant is allowed to circulate.

An object of the present invention is to provide an article with a plurality of small passages which are spaced close together and which are adapted to conduct cooling fluid therethrough.

Another object is to provide such an article by a comparatively simple method which does not rely upon passage-machining or otherwise intricate passage-forming steps and which has a relatively low manufacturing cost.

Still another object is to provide an article having effectually an exposed interior yet having the added rigidity as imparted by a stiff core.

These and other objects will appear upon consideration of the following description read in conjunction with the accompanying drawings in which:

Fig. 1 is a view of a finished article made in accordance with the present invention;

Fig. 2 is a section through the core member;

Fig. 3 is a section taken of the finished article; and

Fig. 4 is a section of the envelope used in an alternate method of constructing the finished article.

In reference to Fig. 1 of the drawings, numeral 10 indicates an article such as a turbine blade having an intersticed core or insert 12. The body member may be of conventional type which ordinarily would have a root 14, a throat 16, and a blade 18. The blade might be expected to have the usual concavo-convex form and to be defined by a leading edge 20, a tip 22, and a trailing edge 24. The core is exposed at envelope openings which may be located in the root 14, tip 22, and trailing edge 24.

Best seen in Fig. 2, the intersticed or porous core 12 is formed to predetermined shape by use of conventional means which may be a die. If powdered metal or metals happen to be the core material chosen, they may be packed within the die and, by application of heat, sintered into a porous mass conforming to the shape of the die. As an alternative, the powdered metallics could be compressed in the die to assume a briquet-like consistency, removed, and then sintered to assume permanently the form which had been imparted beforehand.

In Fig. 3 is seen the core after the sheath or envelope 13 has been applied. One method of applying this enveloping casing would be to support the core within a mold or die and cast the envelope over and around the core. If the envelope came prepared in mating halves, they could be fitted around the core and fastened or welded together to form the continuous envelope. Then too, the core may be provided with an envelope by electroplating, or by dip or otherwise coating it to a desired thickness.

In the respect of Fig. 4, a modified technique may be employed whereby the envelope 23 is the member first formed. One means of formation would be to prepare mating halves and fasten them together along their lengthwise faces with rivets, welds, or the like or otherwise fabricate them to yield the casing desired. Being made of a Stellite-like substance, this envelope 23 lends itself also to formation by a regular casting process or by precision investment casting, either method of which can be used to produce a hollow casting.

The inside of the envelope is finished in what may be a variety of manners. It may be left smooth and given a thin bonding coating. It may be provided with longitudinal stiffening ribs or else formed with cast or machined grooves in its face. The inside may also be formed with a reverse flare toward the tip of the article such that the walls of the cavity 25 generally converge toward one another.

In any event, the cavity 25 is then filled with a foraminous or porous substance such as powdered metal or metals which can be given permanent shape as by sintering. The finished article will then have minute crevices and passageways extending internally through it.

If nozzle vanes and, more particularly, turbine buckets are contemplated as the finished blading, provision may perhaps be found necessary for locking the core to the envelope. One feasible composition for the core would include copper, nickel, or a combination of the two, in which case an internal coating of a kindred composition on the envelope would serve as a good bonding layer between the two members. Stiffening ribs or grooves on the inside surface of the envelope would afford gripping means which the core could act to engage, or else dimples or raised lands might be employed. Then too, imparting a reverse flare to the interior of the envelope would cause the core wedgingly to engage the surface.

Preferably the core is composed of a metallic substance which will exhibit good heat conductive qualities. The purpose is that the heat acquired by the Stellite-like envelope may readily be dissipated by being led rapidly away and transferred to the coolant by the core. Within the broader aspects of the invention however, the core may be of a porous ceramic, like brick, or other foraminated material which will allow passage of air or other coolant.

Although the present invention has been shown and described by specific embodiment representation, it will be evident that various changes in the form, number, and arrangement of elements may be made within the spirit and scope thereof.

What is claimed is:

A turbine blade of the air cooled type having root and tip portions formed thereon, leading and trailing edges extending between said root and tip portions, said blade further including a body member having a hollow interior, and a stiff core within the hollow body member and bonded to the interior of such member for rigidifying same, said body member being formed with a reverse flare toward the tip portion so that the distance between said leading and trailing edges is a maximum at a point intermediate said tip and root portions, said core member being shaped to mate therewith whereby the core and body member are restrained from any relative radial movement due to centrifugal force, said hollow body member being formed of impervious metal and having a smooth finished exterior surface, said core being formed of a sintered metallic powder having a porous texture, said covering having openings therein at the root and tip portion and along the trailing edge to expose the pervious core, said pervious core having interstitial passages therein for the passage of cooling air therethrough, and said openings providing entrance and exit passages for said cooling air.

ROBERT H. SMITH.
CORNELIUS J. VAN HALTERN.

References Cited in the file of this patent

UNITED STATES PATENTS

| Number | Name | Date |
|---|---|---|
| 1,556,658 | Williams | Oct. 13, 1925 |
| 1,835,971 | Schattanek | Dec. 8, 1931 |
| 2,149,510 | Darrieus | Mar. 7, 1939 |
| 2,206,395 | Gertler | July 2, 1940 |
| 2,221,722 | Reynolds | Nov. 12, 1940 |
| 2,236,426 | Faber | Mar. 25, 1941 |
| 2,269,200 | Hillner | Jan. 6, 1942 |
| 2,297,446 | Zellbeck | Sept. 29, 1942 |
| 2,323,162 | Talmage | June 29, 1943 |
| 2,365,083 | Jarrett | Dec. 12, 1944 |
| 2,387,073 | Horlacher | Oct. 16, 1945 |
| 2,393,323 | Hungerford | Jan. 22, 1946 |
| 2,398,132 | Cottrell | Apr. 9, 1946 |
| 2,401,797 | Rasmussen | June 11, 1946 |
| 2,448,315 | Kunzog | Aug. 31, 1948 |
| 2,520,373 | Price | Aug. 29, 1950 |

FOREIGN PATENTS

| Number | Country | Date |
|---|---|---|
| 711,419 | France | Sept. 9, 1931 |